Feb. 6, 1951 V. T. MOORE 2,540,902
THRUST BALANCING MEANS
Filed Nov. 24, 1944 3 Sheets-Sheet 1

INVENTOR.
VINCENT T. MOORE
BY
ATTORNEY

Feb. 6, 1951 V. T. MOORE 2,540,902
THRUST BALANCING MEANS
Filed Nov. 24, 1944 3 Sheets-Sheet 3

INVENTOR.
VINCENT T. MOORE
BY
ATTORNEY

Patented Feb. 6, 1951

2,540,902

UNITED STATES PATENT OFFICE 2,540,902

THRUST BALANCING MEANS

Vincent T. Moore, Ridgewood, N. J., assignor to Wright Aeronautical Corporation, a corporation of New York Application November 24, 1944, Serial No. 565,022

7 Claims. (Cl. 60—41)

This invention relates to thrust balancing means and is particularly directed to means for balancing the axial thrust on a rotating member as for example the rotor of a turbine.

One of the problems encountered in the operation of a turbine, particularly with a reaction turbine, is the provision of adequate means for balancing the axial thrust on the turbine rotor produced by the pressure differential of the turbine motive fluid across the turbine rotor. With the usual thrust bearing structure this thrust is transmitted from the bearing to the supporting structure. It is an object of this invention to provide means to balance this thrust in whole or in part. It is a further object of this invention to balance this thrust in such a manner that the thrust is not transmitted to any of the fixed turbine supporting structure.

Specifically one form of the invention comprises a balancing piston subjected to the pressure of the turbine motive fluid and engaging a thrust surface carried by the turbine rotor. This balancing piston is sealed at its outer periphery by means of a flexible bellows construction whereby the piston is permitted to float and exert its entire axial thrust against the thrust surface on the turbine rotor in order to balance the axial turbine thrust. This balancing piston may be designed to balance part or all of the thrust on the turbine rotor.

It is also an object of this invention to provide means for balancing the axial turbine thrust and requiring no thrust bearing structure. To this end an annular disc or piston-like member is rigidly carried by the turbine rotor and is subjected to the pressure of the turbine motive fluid. The outer periphery of this disc or piston-like member is sealed by means of a fixed annular baffle member extending into an annulus of liquid disposed in an annular groove or channel formed adjacent the outer periphery of the disc or piston-like member. It is a further object of this invention to provide continuous circulation of this sealing fluid in order to dissipate the heat generated by the friction between the annular baffle member and the rotating liquid columns.

Other objects of this invention will become apparent upon reading the annexed detailed description in connection with the drawing in which:

Figure 4 is an enlarged view of a portion of Figure 3.

Figure 1:
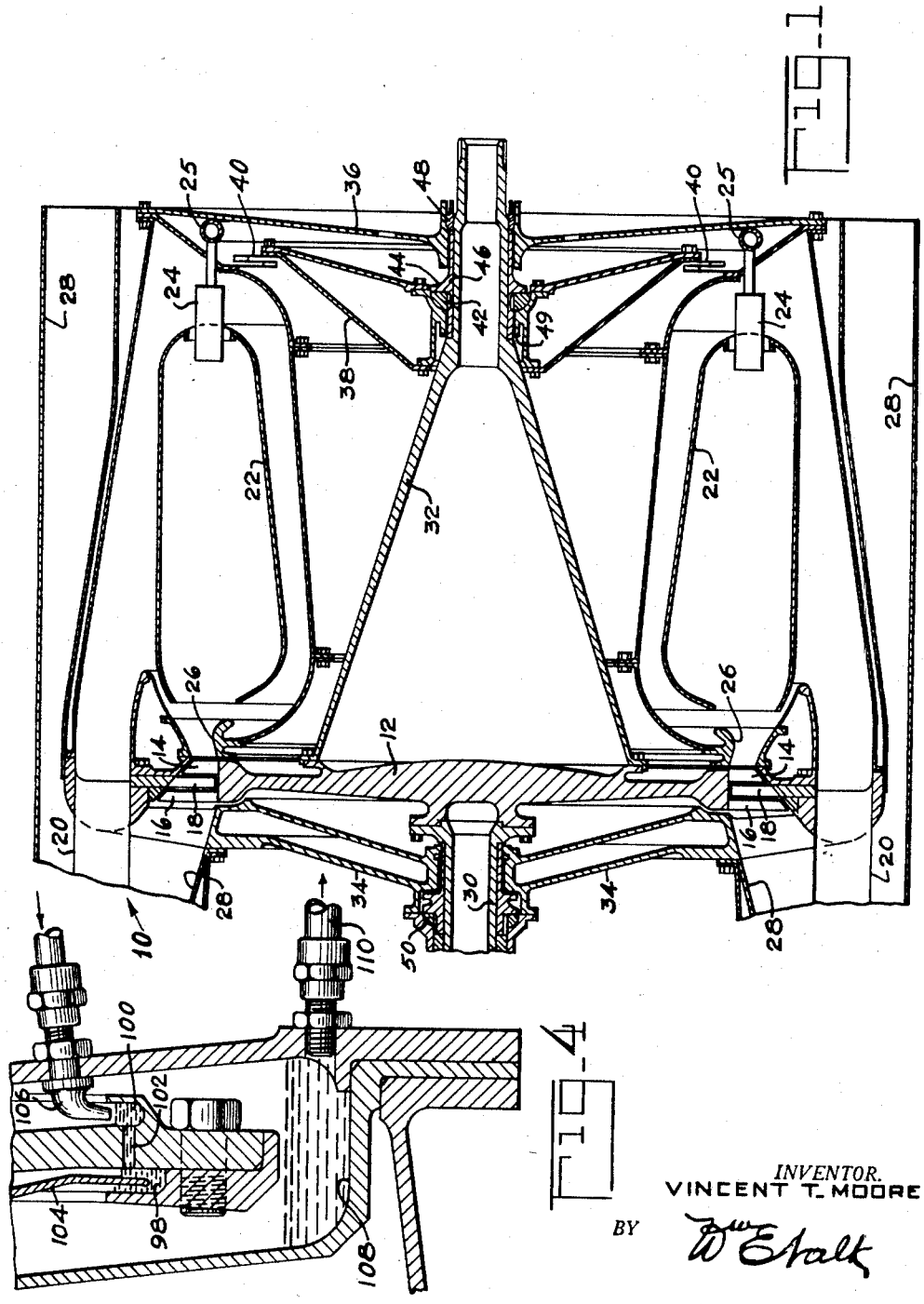
Figure 1 is an axial section through a portion of a gas turbine power plant and illustrates one form of piston for balancing the axial thrust on the turbine rotor.

Referring first to Figure 1, a gas turbine power plant indicated in part at 10 comprises a turbine rotor or wheel 12 having one or more sets of turbine blades disposed about its periphery. As illustrated, the wheel 12 is provided with two sets of blades 14 and 16 and a fixed set of blades 18 are carried by the fixed turbine structure between the rotating blades 14 and 16. A plurality of ducts 20 are circumferentially spaced about the periphery of the turbine wheel 12 for supplying air to an annular combustion chamber 22 to which fuel is supplied from the nozzles 24 and fuel manifold 25. From the combustion chamber 22 the combustion gases are directed by the turbine nozzle 26 into the turbine blades 14, 16 and 18 from which the combustion gases are discharged into an exhaust duct 28. A pair of coaxial turbine driven shafts 30 and 32 extend oppositely from the turbine wheel 12 and are journaled within supporting diaphragms 34 and 36, respectively. The gas turbine power plant may also include a compressor (not shown) driven for example by the turbine shaft 30 for applying compressed air to the turbine combustion chamber 22 through ducts 20. For a more complete description of the gas turbine power plant, attention is directed to the co-pending application of W. G. Lundquist, Serial No. 565,019, filed November, 24, 1944, which has matured into Patent No. 2,469,439.

Particularly in a reaction turbine there is a substantial pressure drop of the turbine motive fluid across the turbine blades. The turbine motive fluid pressure on the upstream end of the turbine wheel is transmitted radially inwardly through the annular space between the turbine wheel and the relatively fixed turbine nozzle. Similarly, the discharge pressure of the turbine motive fluid is transmitted inwardly through the annular space between the turbine wheel and the relatively fixed turbine supporting structure 34, this latter pressure being substantially atmospheric. Accordingly the turbine wheel 12 is subjected to the fluid pressure differential of the turbine motive fluid thereacross which is effective to urge the turbine wheel axially to the left as viewed in the drawing.

In order to at least partly balance this axial thrust, an annular balancing piston 38 is provided. This balancing piston is subjected to the same turbine motive fluid pressure as acts on the upstream side of the turbine wheel. The balancing piston is secured to the fixed structure of the turbine by a flexible bellows-type diaphragm 40, which thereby provides a seal between the outer periphery of the balancing piston and the adjacent fixed structure of the turbine and permits small axial movements of said piston relative to said fixed structure. The hub of the piston 38 is seated against an annular thrust bearing 42 which in turn is disposed against a flange 44 formed on a sleeve 46 secured to the turbine shaft 32 by a nut 48. In addition a suitable plain bearing 49 is disposed between the hub of the balancing piston 38 and the sleeve 46. Accordingly, the bearing 49 and thrust bearing 42 provide a seal between the non-rotatable balancing piston 38 and the turbine rotor. In this way the facing sides of the balance piston 38 and the turbine wheel 12 are subjected to the same pressure of the turbine motive fluid while their remote sides are subjected substantially to atmospheric pressure. Obviously, suitable sealing piston rings may be provided between the hub of the balancing piston 38 and the turbine rotor in addition to the plain bearing 49 or in lieu thereof.

With this construction the balance piston 38 is subjected to a pressure differential which through the thrust bearing 42 urges the turbine wheel 12 axially to the right to at least partially balance the axial thrust of the turbine motive fluid on the turbine wheel. Accordingly, if the balance piston 38 were provided with a diameter substantially equal to the effective diameter of the turbine wheel, the balance piston would be operative to balance the entire axial thrust of the turbine motive fluid on the turbine wheel. However, as illustrated, the diameter of the balance piston 38 is somewhat less than the diameter of the turbine wheel 12 and therefore only a portion of the turbine thrust is balanced. The remainder of the turbine thrust is taken by a thrust bearing 50 carried by the fixed support 34.

It should be noted that because of the flexibility of the bellows 40, that portion of the turbine thrust balanced by the piston 38 is not transmitted to any on the fixed turbine structure.

Figure 2:
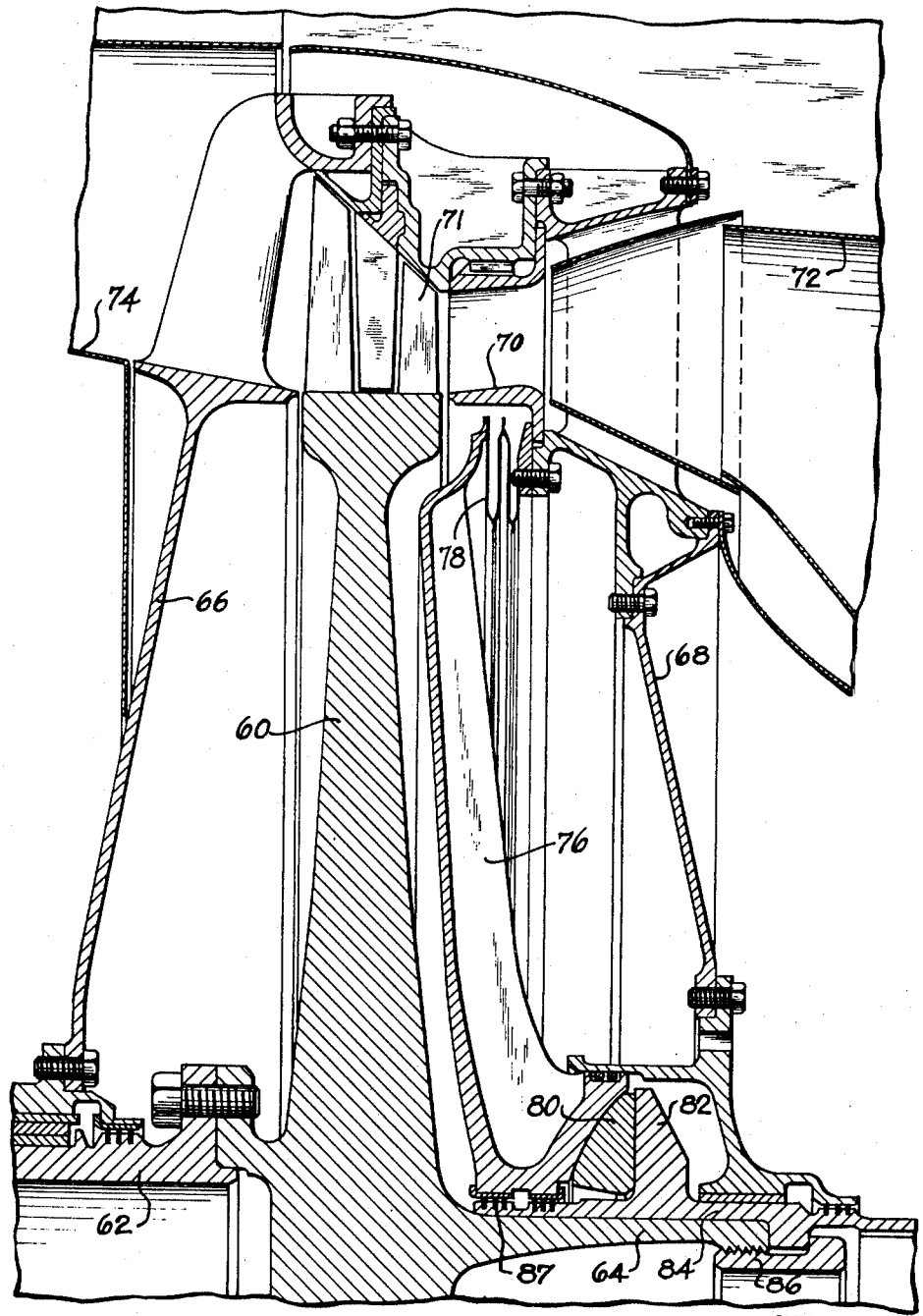
Figure 2 is an axial section illustrating a modified form of balancing piston.

Figure 2 is a modification similar to Figure 1. In Figure 2, the turbine wheel 60 is provided with opposed shaft extensions 62 and 64 journaled within the supporting diaphragm 66 and 68 respectively. The diaphragm 68 also supports the turbine nozzle 70 which directs the combustion gas from the turbine combustion chamber 72 into the turbine blades 71, from which the gas is discharged into the exhaust duct 74. Thus, as in Figure 1, the turbine wheel is subjected to a fluid pressure differential urging the turbine wheel axially to the left. In order to balance this axial thrust an annular balancing piston 76 is provided. The outer periphery of the balancing piston 76 is connected to the support 68 by a flexible bellows type diaphragm 78, while the hub of the piston 76 engages a thrust bearing 80 disposed against a flange 82 on a sleeve 84 secured to the shaft 64 by a nut 86. Suitable seal rings 87 are provided between the hub of the balancing piston 76 and the turbine rotor, which, alone or together with the thrust bearing 80, provides a seal between the rotatively fixed balancing piston 76 and turbine rotor.

The structure of Figure 2 is quite similar to that of Figure 1, except the balancing piston is disposed quite close to the turbine wheel whereby the structure of Figure 2 is considerably more compact. However, with the arrangement of Figure 2, the balancing piston necessarily must have a smaller diameter than that of the turbine wheel and therefore the piston can only balance a portion of the axial thrust on the turbine wheel. In addition, as in Figure 1, the balanced portion of the thrust is not transmitted to the fixed structure of the turbine.

Figure 3:
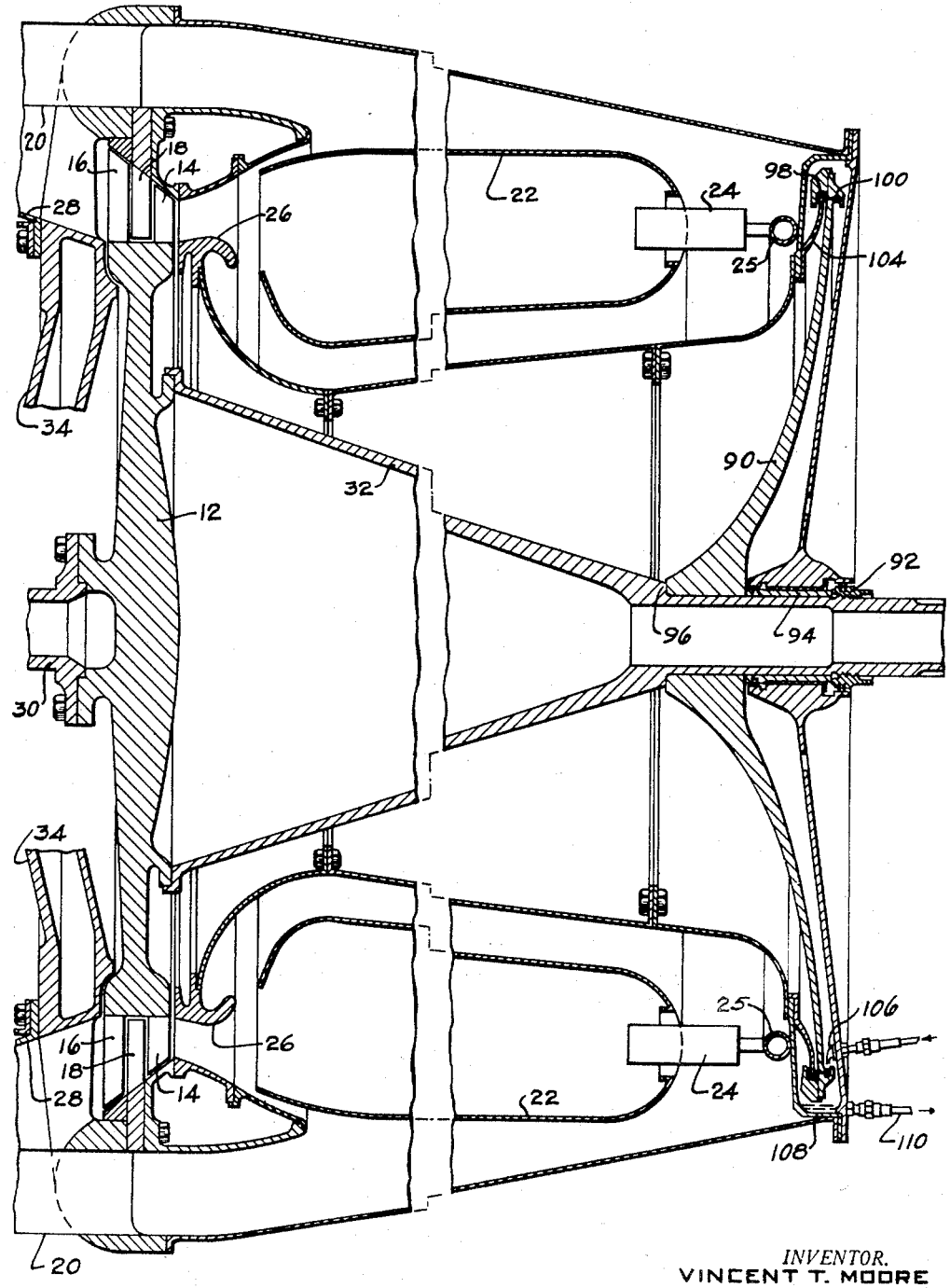
Figure 3 is an axial section similar to Figure 1 and illustrates a balancing piston in which the outer periphery of the piston is sealed by a liquid annulus.

Referring now to Figures 3 and 4, which illustrate a further modification, the structure of the gas turbine is identical to that of Figure 1 except for the structure of the balancing piston and similar parts have been designated by similar reference numerals. In Figures 3 and 4 the balancing piston 90 is secured rigidly to the turbine shaft 32 by a nut 92 which, through the sleeve 94, clamps the hub of the piston 90 against the turbine shaft shoulder 96. The outer periphery of the balancing piston 90 is provided with a pair of inwardly opening annular channels or grooves 98 and 100, connected by a plurality of passages 102. A fixed annular baffle member 104 extends into the annular channel 98 and a suitable liquid is supplied to the annular channel 100 through a supply nozzle 106. Liquid from the annular channel 100 enters the annular channel 98 by way of the interconnecting passages 102.

With this construction of Figures 3 and 4, liquid is supplied to the annular channel 100 during turbine operation and accordingly the annular channels 98 and 100 both fill with liquid around their entire circumference. The liquid is maintained within these channels by the centrifugal forces acting thereon. With the annular baffle 104 extending into the liquid within the channel 98, the outer periphery of the piston 90 is sealed to prevent leakage of the pressure of the turbine motive fluid around the piston.

The pressure differential between the turbine motive fluid pressure on the one side of the baffle member 104 and the substantially atmospheric pressure on the other side causes a relative displacement in the level of the liquid in the annular channel 100 on opposite sides of the baffle member 104, such that the difference in the centrifugal force acting on the two annular columns of liquid on opposite sides of the baffle member 104 balance the fluid pressure differential thereacross. Because of the high speed rotation of the turbine wheel, the resulting centrifugal forces acting on the liquid annulus in the channel 100 are quite large and therefore the difference in the levels of the liquid on opposite sides of the baffle member 104 is quite small. This difference in level on the liquid on opposite sides of the baffle member 104 is illustrated in Figure 4. In this way, the liquid annulus within the channel 100 provides a seal which effectively prevents the transmission of the turbine motive fluid pressure around the periphery of the piston 90.

As illustrated in Figures 3 and 4, the piston 90 is substantially of the same diameter as the turbine wheel 12 and therefore, since the turbine wheel and piston are subjected to substantially the same pressure differential, the piston 90 balances substantially the entire thrust acting on the turbine wheel. The structure of Figures 3 and 4 has the advantage over that of Figures 1 and 2 in that no thrust bearings are required in order to balance the axial thrust on the turbine wheel. Obviously, if desired the piston 90 may be of smaller diameter, in which case it would only balance a portion of the axial turbine thrust. Also as illustrated the construction of the piston 90 is such that its outer portions are displaced axially in the direction of the pressure differential acting thereon. With this construction, the centrifugal force acting on the piston tends to flatten this member out against this pressure differential. That is, the centrifugal force acting on the piston 90 is balanced at least partially by this pressure differential. Because of this arrangement the piston can be of relatively light construction.

The friction between the baffle member 104 and the liquid within the channel 100 may develop considerable heat. This heat is dissipated by providing for continual circulation of the liquid into and out of the channels 98 and 100. Thus, during turbine operation, liquid is continually supplied through a nozzle 106, and the excess liquid supplied to the channels 98 and 100 spills out into a sump 108 at the bottom of the turbine casing and from which the liquid is removed through a conduit 110 and then cooled and recirculated.

Various liquids may be used in the modification of Figures 3 and 4, such as mercury, lubricating oil, water, or fuel, depending on the particular installation and arrangement. Thus, if the liquid seal is disposed at a point where the temperatures are quite high, the liquid must have a sufficiently high boiling point to remain liquid at these high temperatures.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a gas turbine power plant having fixed housing structure and a rotor mounted therein, said rotor being subjected, during turbine operation, to a pressure differential imposing an axial thrust on said rotor: a thrust balancing member co-axial with said rotor; an annular shoulder on said rotor; means disposed between said member and said rotor to inhibit fluid flow therebetween and to provide a thrust bearing between said member and said rotor shoulder for resisting axial movement of said rotor in the direction of said axial thrust; and annular axially flexible means connecting the periphery of said member to fixed structure of said power plant to inhibit fluid flow across the periphery of said member; said member being subjected, during turbine operation, to a pressure differential imposing an axial force on said member which, through said thrust bearing, is applied to said rotor shoulder to at least partially balance said axial rotor thrust.

2. In a gas turbine power plant as recited in claim 1 in which said means comprises an annular flexible diaphragm.

3. In a gas turbine power plant as recited in claim 1 in which said member is non-rotatable and said axially flexible means is rotationally rigid.

4. In a gas turbine power plant having fixed housing structure and a rotor mounted therein, said rotor being subjected, during turbine operation, to an axial thrust imposed by the pressures of the turbine motive fluid upstream and downstream of said rotor: a thrust balancing member co-axial with said rotor; an annular shoulder on said rotor; means disposed between said member and said rotor to inhibit fluid flow therebetween and to provide a thrust bearing between said member and said rotor shoulder for resisting axial movement of said rotor in the direction of said axial thrust; and annular axially flexible means interconnecting the periphery of said member with fixed structure of said power plant to inhibit fluid flow across the periphery of said member; one side of said member being subjected to the pressure of the turbine motive fluid on the high pressure side of said rotor to impose an axial force on said member which, through said thrust bearing, is applied to said rotor shoulder to at least partially balance said axial rotor thrust.

5. In combination: a rotor; fixed housing structure in which said rotor is mounted, said rotor being subjected, during operation, to a pressure differential imposing an axial thrust on said rotor; a thrust balancing member co-axial with said rotor; an annular shoulder on said rotor; means disposed between said member and said rotor to inhibit fluid therebetween and to provide a thrust bearing between said member and said rotor shoulder; an annular axially flexible means connecting the periphery of said member to said fixed structure; said member being subjected, during rotor operation, to a pressure differential imposing an axial force on said member which, through said thrust bearing, is applied to said rotor shoulder to at least partially balance said axial rotor thrust.

6. In a gas turbine power plant comprising fixed structure, including a combustion chamber, and a turbine rotor disposed within said fixed structure, at one end of said chamber, said rotor having a shaft extending at least to the other end of said chamber and being subjected, during turbine operation, to a pressure differential imposing an axial thrust on said rotor: a thrust balancing member co-axial with said rotor and disposed beyond the end of said combustion chamber remote from said rotor; an annular shoulder on said shaft; means disposed between said member and said shaft to inhibit fluid flow therebetween and to provide a thrust bearing between said member and said shoulder for resisting axial movement of said rotor in the direction of said axial thrust; and annular axially flexible means interconnecting the periphery of said member with fixed structure of said power plant to inhibit fluid flow across the periphery of said member; said member being subjected, during turbine operation to a pressure imposing an axial force on said member which, through said thrust bearing, is applied to said shaft shoulder to at least partially balance said axial thrust.

7. In a gas turbine power plant comprising fixed structure, including a combustion chamber, and a turbine rotor disposed within said fixed structure at one end of said chamber, said rotor having a shaft extending therefrom and being subjected, during turbine operation, to a pressure differential imposing an axial thrust on said rotor: a thrust balancing member co-axial with said rotor and disposed adjacent thereto on the combustion chamber side of said rotor; an annular shoulder on said shaft; means disposed between said member and said shaft to inhibit fluid flow therebetween and to provide a thrust bearing between said member and said shoulder for resisting axial movement of said rotor in the direction of said axial thrust; and annular axially flexible means interconnecting the periphery of said member with fixed structure of said power plant to inhibit fluid flow across the periphery of said member: said member being subjected, during turbine operation, to a pressure imposing an axial force on said member which, through said thrust bearing, is applied to said shaft shoulder to at least partially balance said axial thrust.

VINCENT T. MOORE.

REFERENCES CITED

The following references are of record in the file of this patent:

UNITED STATES PATENTS

| Number | Name | Date |
|---|---|---|
| 813,723 | Longwell et al. | Feb. 27, 1906 |
| 1,012,638 | Hodgkinson | Dec. 26, 1911 |
| 1,255,852 | Bengtson | Feb. 12, 1918 |
| 1,886,414 | Meyer | Nov. 8, 1932 |
| 1,895,003 | Meyer | Jan. 24, 1933 |
| 2,133,879 | Thearle | Oct. 18, 1938 |
| 2,272,676 | Leduc | Feb. 10, 1942 |